United States Patent [19]

Noguchi et al.

[11] 4,365,309

[45] Dec. 21, 1982

[54] DIGITAL DIFFERENTIAL ANALYZING PROCESSOR

[75] Inventors: Atomi Noguchi, Hitachi; Jushi Ide, Mito; Hiroshi Kuwahara; Yoshihiro Miyazaki, both of Hitachi, all of Japan

[73] Assignee: Hitachi, Ltd., Tokyo, Japan

[21] Appl. No.: 193,445

[22] Filed: Oct. 3, 1980

[51] Int. Cl.³ .................................................. G06F 7/64
[52] U.S. Cl. ...................................... 364/702; 364/704
[58] Field of Search ................................. 364/702, 704

[56] References Cited

U.S. PATENT DOCUMENTS 3,419,711 12/1968 Hunter et al. .................. 364/704 X
3,601,591 8/1971 Gaines et al. ......................... 364/702
4,107,773 8/1978 Gilbreath et al. .............. 364/704 X Primary Examiner—David H. Malzahn
Attorney, Agent, or Firm—Antonelli, Terry and Wands

[57] ABSTRACT

A digital differential analyzer (DDA) is connected through a direct memory access bus (DMA bus) to a host processor so as to receive an operation defining parameter and data, thereby to process a differential analysis as a digital operation.

The DDA has mainly an arithmetic processor for DDA operation, and a control processor for performing the control concerning DMA to the host processor and the start and end control of the DDA operation which is performed by the arithmetic processor. This DDA decreases the amount of program to be processed by the host processor.

5 Claims, 9 Drawing Figures

DIGITAL DIFFERENTIAL ANALYZING PROCESSOR

BACKGROUND OF THE INVENTION

This invention relates to digital differential analyzers (DDA) and particularly to a DDA which is connected through a direct memory access bus to a host processor to receive a parameter defining an arithmetic operation and data from the host processor and to process a differential analysis as a digital operation.

The DDA is supplied with input variables of a digitized form to which voltages and currents used in analog computers are converted, and produces at its output a quantized digital signal of finite increments which occur with the change of the input variables, on the basis of sectional quadrature.

In general, the calculation of the following expression, $$Y = \int x \cdot dx + Y_o \quad (1)$$

is approximately determined as $$Y = \sum_{i=o}^{n} x_i \cdot \Delta t_i \quad (2)$$

by applying the sectional quadrature to its geometrical contents. Thus, the equivalent operation of Eq. (2) can be performed for the above-mentioned digital signal by the digital formation of all the arrangements.

For simple and economical arrangement, a set of fundamental arithmetic circuits are provided, and the results of the operation are obtained as a constant increment from the set of the circuits and written into an operation result memory called the $\Delta Z$ memory. The set of arithmetic circuits is formed for various operation elements and operated by an operation-mode command. To the inputs of the operation elements are applied the contents of the $\Delta Z$ memory, and the results of operation therein are again stored in the $\Delta Z$ memory. Thus, it is suitable to perform data access operation between the operation elements through the $\Delta Z$ memory. Therefore, the DDA employs a set of arithmetic circuits the function of which is specified when a necessary operation function is requested at each stage of a sequence of operations. The results of operation at the preceding stage is used as an operation input, and thus the set of arithmetic circuits are used in time sharing, or in a serial manner.

For operation of the DDA, it is necessary to specify predetermined operation elements, or integrators, multipliers, adders and so on and determine how the inputs and outputs of the operation elements are interconnected. The key board provided in the DDA is operated, or the host processor connected through the direct memory access bus (DMA) is used, thereby to specify the functions of the operation elements at each stage of operation. Information for interconnecting the operation elements is applied to the DDA and stored in the memory within the DDA. This stored information is used for sequential performance of the arithmetic operation.

In the system in which the DDA is controlled by the host processor, the host processor and the DDA are interconnected through the DMA bus, and the DDA includes a hardware only for arithmetic operation, or a DDA processor. The host processor first transfers a parameter for defining the arithmetic operation to the DDA processor to start operation.

The DDA processor, when having finished the arithmetic operation of DDA, interrupts the host processor, and transmits its solution by the input-output control through the DMA bus.

In the conventional system, the host processor is needed to transfer an operation parameter and solution data at each operation and control the start of the DDA processor. Since the software program for the host processor is frequently executed, the load rate of the processor and DMA bus is increased, and response speed is decreased.

Particularly in the application where a plurality of DDA operations are needed to be processed at a time and at a high speed, it is necessary to provide a plurality of DDAs, which is uneconomical. Besides, a complex subroutine including a plurality of DDA operation processes, or the like remarkably reduces the response time.

SUMMARY OF THE INVENTION

Accordingly, it is an object of the invention to provide a DDA capable of reducing the amount of data to be transferred between the host processor and the DDA processor and the amount of program to be processed in the host processor, and improving the DDA operation processing speed.

According to the invention, there is provided a DDA the DDA processor of which comprises an arithmetic processor for performing the DDA arithmetic processing only, and a control processor for allowing this arithmetic processor to carry out an arbitrary DDA operation and for transferring data to or from the host processor and processing and transmitting error, i.e., for data processing only, said two processors being operated in parallel.

Once the host processor starts the control processor, the control processor acts directly to access the memory regardless of processing of program in the host processor (as it is called the direct memory access) and fetches a parameter for a DDA operation to permit the arithmetic processor to carry out DDA arithmetic processing, the results of the operation being transferred to the host processor. In this way, the respective processors perform their favorite arithmetic processing and data processing in parallel, or at the same time thereby to attain the above object.

The second feature of the invention is that the parameters of a plurality of equations for DDA operation and the results on the way of operation are stored in a data memory which each processor can access, and that the plurality of DDA operation equations are calculated in time sharing, the results during operation being transmitted to the host processor.

The third feature of the invention is that the arithmetic processor is controlled on a microprogram, which can be read or written by the host processor. Therefore, a microprogram suitable for each application can be incorporated, thus enabling the provision of a flexible DDA.

DESCRIPTION OF THE PREFERRED EMBODIMENTS

Figure 1:
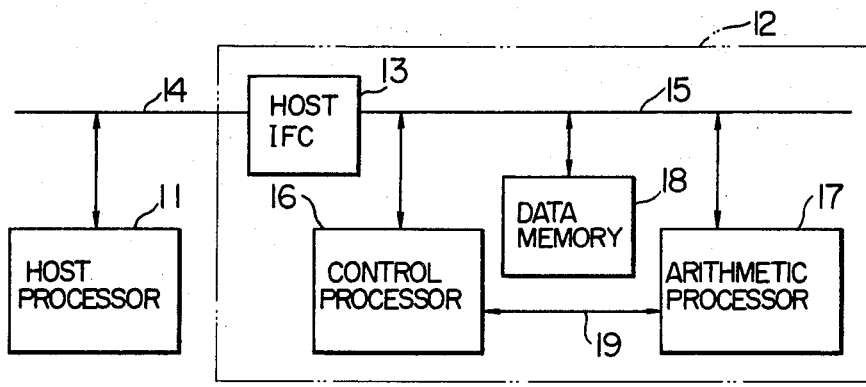
FIG. 1 is a block diagram of the whole of the DDA according to the invention.

FIG. 1 is a block diagram of an embodiment of the present invention. There is shown a DDA 12 including a control processor 16, an arithmetic processor 17, a data memory 18, and a host interface circuit 13. These elements are connected to a DMA bus 15, through which data is transferred among the elements. The control processor 16 and the arithmetic processor 17 are interconnected by an arithmetic processor control signal line 19 so that the control processor 16 controls the arithmetic processor 17 and the arithmetic processor 17 applies an end interruption and status information to the control processor 16.

The host interface circuit 13 is connected to a DMA bus 14 of a host processor 11, thus enabling data to be transferred between the host processor 11 and the DDA 12.

Figure 2:
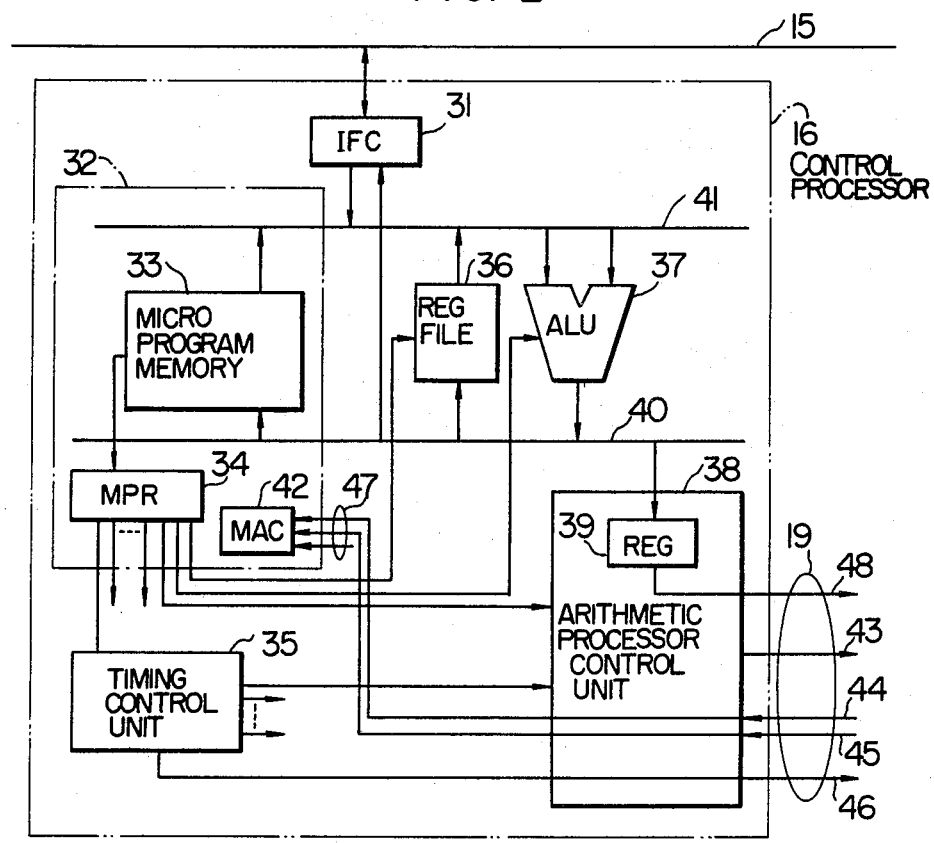
FIG. 2 is a block diagram of an example of the control processor in FIG. 1.

FIG. 2 is the block diagram of an example of the control processor 16.

The control processor 16 includes a DMA bus interface circuit 31, a microprogram control unit 32, a register file 36, an arithmetic unit 37, a timing contrl circuit 35 and an arithmetic processor control unit 38. These elements are connected to a DATAOUT bus 40 and a DATAIN bus 41 within the control processor 16, through which data is transferred among the elements. The bus interface circuit 31 is connected to the DMA bus 15, through which data is transferred among the bus interface circuit 31, host processor 11, data memory 18, and arithmetic processor 17.

The microprogram control unit 32 includes a microprogram memory 33, a microprogram register 34, and a microprogram address control circuit 42, thereby to control the whole of the control processor 16.

The register file 36 and the arithmetic unit 37 are controlled by the microprogram control unit 32 to compute the start address of the arithmetic processor 17.

The timing control circuit 35 controls the timing of operation of the whole control processor 16 and controls the timing of operation of the arithmetic processor 17 through the arithmetic processor control unit 38.

The arithmetic processor control unit 38 supplies to the arithmetic processor 17 a microprogram starting address 48 from a register 39, an arithmetic processor starting signal 43, and an arithmetic processor timing signal 46, thereby to control the arithmetic processor 17, while the unit 38 receives an arithmetic processor operation end interruption signal 44 and an arithmetic processor status signal 45 and sends out different interruption and status signals 47 to the microprogram control unit 32.

Figure 3:
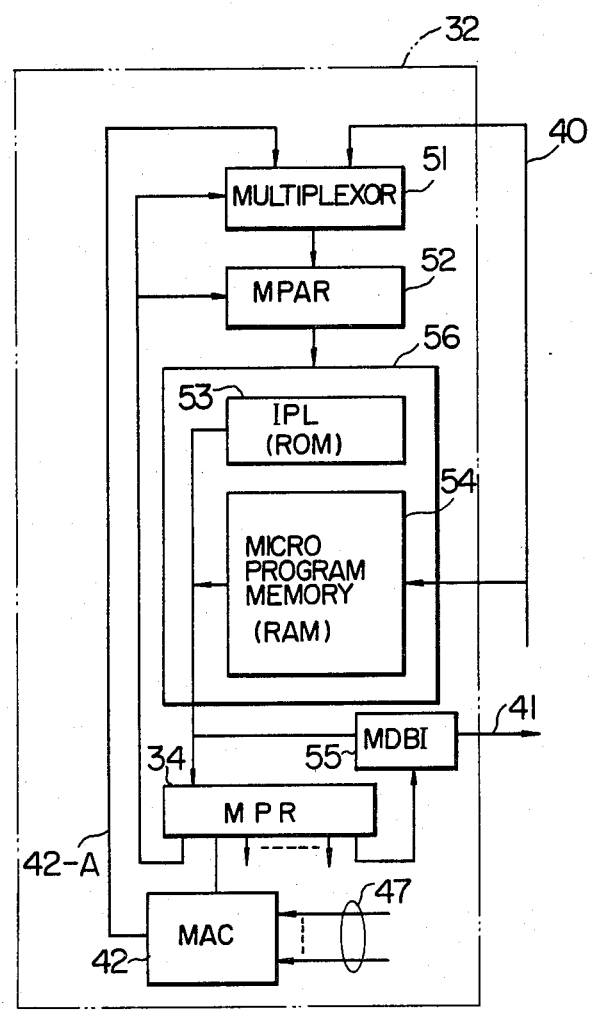
FIG. 3 is a block diagram of an example of the microprogram control unit in FIG. 2.

FIG. 3 shows a specific example of the microprogram control unit 32. A microprogram memory 56, as shown in FIG. 3, includes an IPL ROM (read only memory) 53 for storing the program at the time of starting and a microprogram memory 54 of read and write capability in which information from the host processor 11 is written when the system starts to operate or the DDA is operated, or at each task. Since the bit length of the microprogram memory 56 is generally long, the data transfer from the host processor 11 is separately performed in several sections for one word of the microprogram.

The output of the microprogram memory 56 is connected to the DATAIN bus 41 through the microprogram register 34 and a microprogram data bus interface (MDBI) 55. The output of the microprogram register 34 is used to control the control processor 16 to operate in various ways.

Any address in the microprogram memory 56 is specified by a microprogram address register 52, while a multiplexor 51 is used to specify the contents in the DATAOUT bus 40 or the output, 42-A of the microprogram address control circuit 42.

The microprogram address control circuit (MAC) 42 functions to monitor various interruption, status signals 47 and to respond to the arithmetic end interruption and the like from the arithmetic processor 17, to permit jump from the microprogram to an interruption process routine.

The operation of the control processor 16 will be described below.

First, the control processor 16 is supplied with an instruction and data from the host processor 11 through the DMA bus 14, host interface circuit 13 and DMA bus 15, then decodes the instruction and sets the microprogram start address register 39 thereby to produce the arithmetic processor start signal 43 to start the arithmetic processor 17.

The arithmetic processor 17 then performs a constant DDA operation and supplies the arithmetic end interruption signal 44 to the control processor 16 as the operation end information.

Then, the control processor 16 sets the next microprogram start address in the register 39 and starts the arithmetic processor 17. When execution of instruction has been completed, the result of operation and status information of processor within the DDA 12 are applied to the host processor 11. In addition, the control processor 16, while the processor 17 is operating, performs the data transfer (previously processed data) to the host processor 11, and rearrangement of data and processing (fixed point→floating point) of data for the DDA processing or DMA transfer. Furthermore, the control processor 16 performs a complex processing of the combination of some fundamental DDA operations thereby to reduce the load on the host processor 11 and increase the working efficiency of the arithmetic processor 17. Decrease of transfer rate for each DDA processing will enable effective operation of the arithmetic processor, multiprocessing in on-line real time, and simulation of time scanning.

It is also possible to perform simultaneous parallel processing which can accept the DDA processing demand from the plural tasks of the host processor 11.

Figure 9:
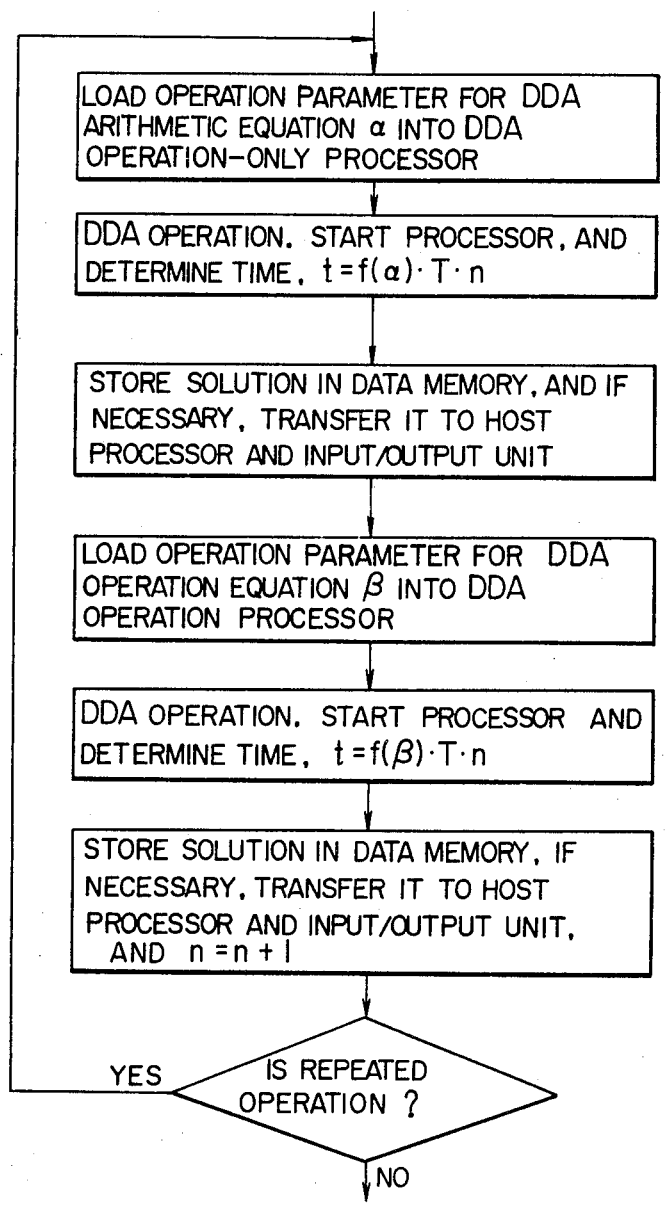
FIG. 9 is a flowchart for simultaneous, parallel processing of two different operations.

FIG. 9 is a flowchart of operation for simultaneous parallel processing of two different DDAs.

Figure 4:
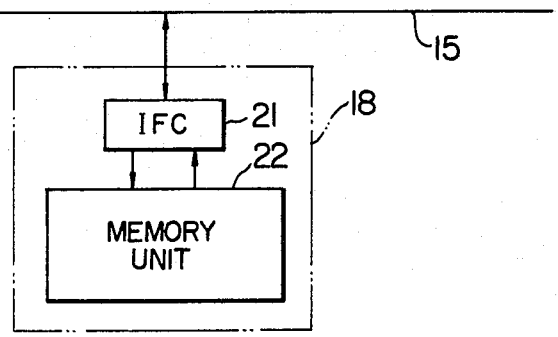
FIG. 4 is a block diagram of an example of the data memory in FIG. 1.

FIG. 4 is a block diagram of an example of the data memory 18.

The data memory 18 includes a memory unit 22 and a DMA interface circuit 21, and is connected to the DMA bus 15, through which it is possible to transfer data to or from the host interface circuit 13, control processor 16 and arithmetic processor 17.

This data memory 18 is able to store data transferred from the host processor 11, data common to the control processor 16 and arithmetic processor 17, data transferred between the control processor 16 and arithmetic processor 17, and the intermediate results of operation at the control processor 16 and arithmetic processor 17.

When the access frequency to the data memory 18 is high and the load on the DMA bus 15 is excessively large, it is desirable that each of the control processor 16 and arithmetic processor 17 be connected to a proper memory so that only a minimum amount of data to be required is stored in the data memory 18.

Figure 5:
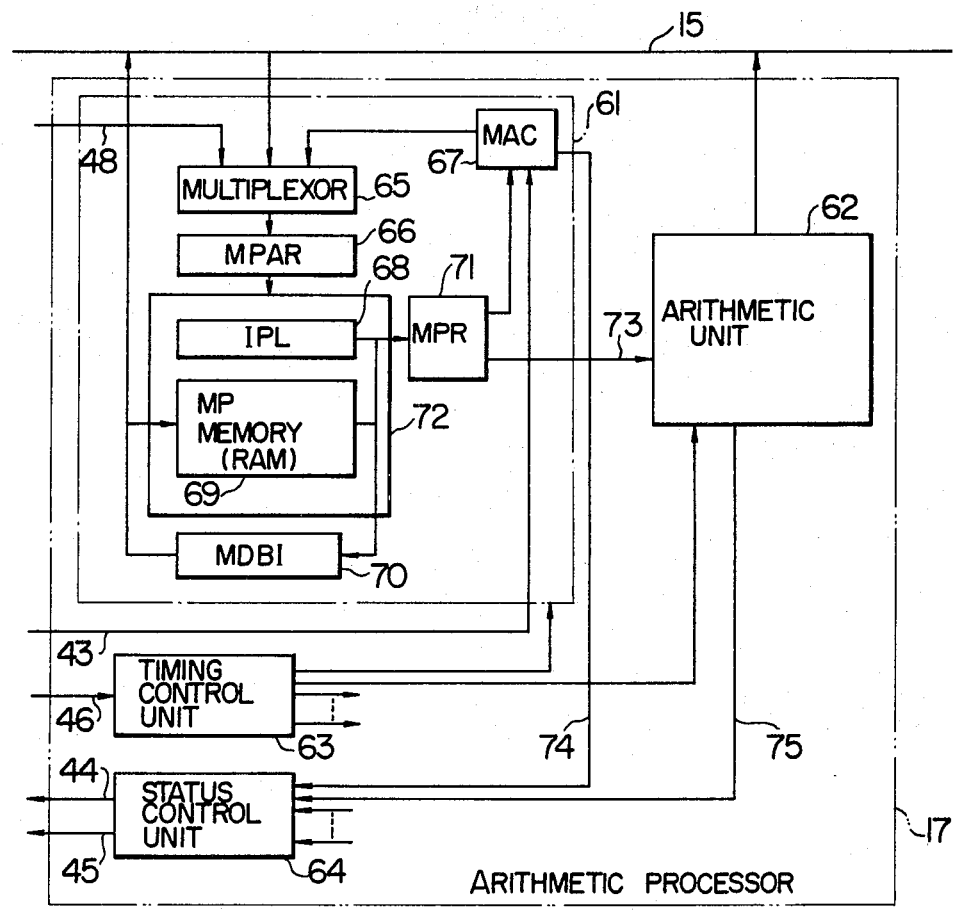
FIG. 5 is a block diagram of an example of the arithmetic processor in FIG. 1.

FIG. 5 is a block diagram of an example of the arithmetic processor 17.

The processor 17 includes a microprogram control unit 61, and arithmetic unit 62, a timing control circuit 63 and a status control circuit 64.

The microprogram control unit 61 includes a microprogram memory 72 having an IPL microprogram memory 68 (read only memory) for storing the program upon starting and a microprogram memory 69 of write and read capability for storing different DDA processing routine at start of system operation or at each task.

The addresses for microprogram are specified by a microprogram address register 66, and it is possible to take three ways of addressing by use of a multiplexor 65. When program is executed in the arithmetic processor 17, addressing is made by a microprogram address control circuit 67. When information is stored from the host processor 11 through the DMA bus 15 to the microprogram memory 69 of read and write capability, an address data on the DMA bus 15 is selected, and when the arithmetic processor 17 is started, the microprogram start address 48 is selected. The output of the microprogram memory 72 is set in a microprogram 71, the output of which is used to control various operations in the arithmetic processor 17. The output of the microprogram memory 72 is connected through a microprogram data bus interface (MDBI) 70 to the DMA bus 15, so that the contents of the microprogram memory 72 can be read from the host processor 11. However, since the bit length of the microprogram is long, each word of the microprogram is written and read in several sections.

The timing control circuit 63 is supplied with the timing signal 46 from the control processor 16 and produces different timing signals in the arithmetic processor 17.

The status control circuit 64 is supplied with a DDA processing routine end detecting signal 74 from the microprogram address control circuit 67, a DDA arithmetic result status signal 75 and other signals, and produces the operation end interruption signal 44 and the status signal 45, which are then sent to the control processor 16.

Figure 6:
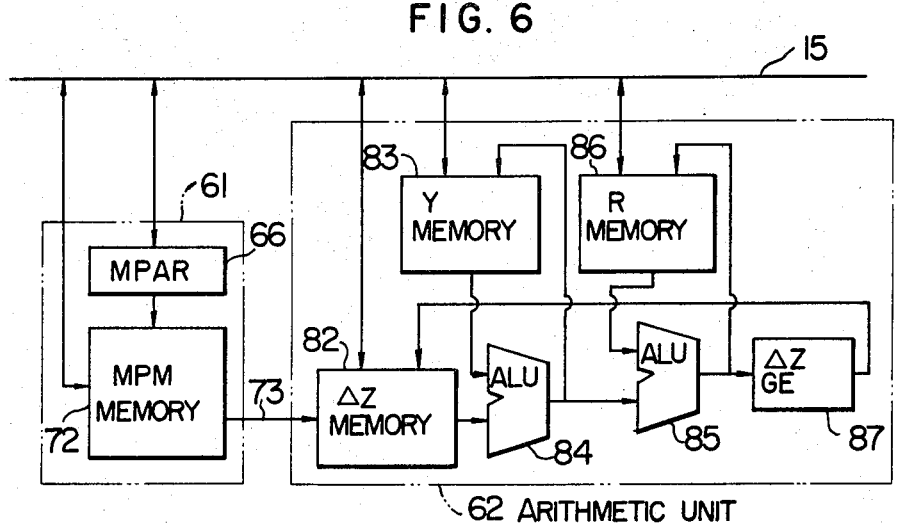
FIG. 6 is a block diagram of an example of the arithmetic unit in FIG. 5.
Figure 7:
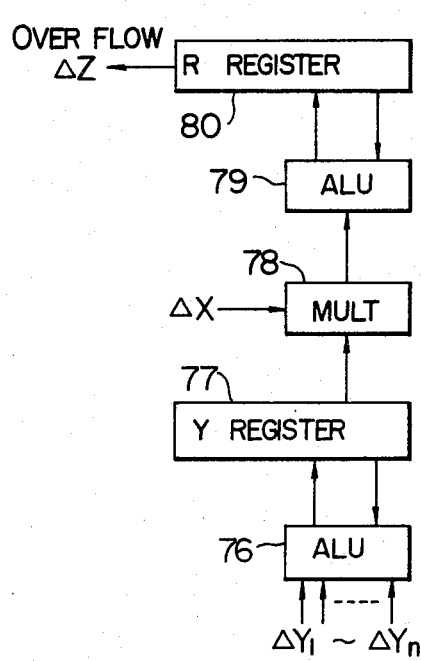
FIG. 7 shows a basic arrangement of the integrator useful for explaining the operation of the arithmetic unit of FIG. 6.

FIG. 6 is a block diagram of an example of the arithmetic unit 62. The arithmetic unit 62 includes a $\Delta Z$ memory 82, a Y memory 83, an R memory 86, adders 84 and 85, and a $\Delta Z$ generator 87. Before the operation of the arithmetic unit 62 as shown in FIG. 6 is described, the operation of an integrator will first be described which is the fundamental of the DDA operation. FIG. 7 shows the basic arrangement of the integrator, which includes adders 76 and 79, a Y register 77 for storing the results of operation of the adder 76, a multiplier 78 and an R register 80 for storing the operation results of the adder 79. In FIG. 7, $\Delta Y_1$ to $\Delta Y_n$ represent very small increments of n input variables. Upon i-th operation, the Y register 77 stores an integrated function $Y_i$ as given by Eq. (3):

$$Y_i = Y_{i-1} + \Delta Y_{1i} + \Delta Y_{2i} + \ldots + \Delta Y_{ni} \qquad (3)$$

$$= Y_{i-1} + \sum_{k=1}^{n} Y_{ki}$$

where the subscript i shows the result of the i-th operation, and the subscript i-1 the result of the proceding operation.

From Eq. (3), it will be seen that the Y register 77 stores the accumulated sum of the increments of input variables as the integrated function Y.

The integration I of the function Y with respect to independent variable x is determined by the sectional quadrature method as well known; that is $$I_i = \sum_{k=1}^{n} Y_k \cdot \Delta x_k \qquad (4)$$

$$= \sum_{k=1}^{n} Y_k \cdot \Delta x_k \cdot Y_i \cdot \Delta x_i$$

$$= I_{i-1} + Y_i \cdot \Delta x_i$$

where $I_i$ represents the i-th sectional quadrature and $Y_i \cdot \Delta x_i$ the result of quadrature of i-th section.

The integration value with practically high precision can be obtained by sufficiently small value of $\Delta x$ in Eq. (4). Here, when $\epsilon$ represents the minimum unit for quantization of the integration independent variable x and $\Delta x$ is defined to be $\Delta x_i = 1$ for increase of x by $\epsilon$, $\Delta x_i = 0$ for increase of x by less than $\epsilon$ and $\Delta x_i = 1$ for decrease of x by $\epsilon$, then Eq. (4) can be rewritten as $$\left. \begin{array}{l} I_i = I_{i+1} + Y_i, \text{ for } x_i = +1 \\ I_i = I_{i-1}, \text{ for } x_i = 0 \\ I_i = I_{i-1} - Y_i, \text{ for } x_i = -1 \end{array} \right\} \qquad (5)$$

Thus, it is possible to omit the multiplier for calculating $Y_i \cdot \Delta x_i$ in Eq. (4), and the $\Delta x_i$ becomes a control pulse for controlling operation. The operation of Eq. (5) is performed in the adder 79 in FIG. 7 by the control pulse $\Delta x_i$. The integration value $I_i$ is stored as $r_i$ in the R register 80.

However, the R register overflows because of its limited capacity. Thus, the range of $Y_i$ is defined to be $-1 \leq Y_i < 7$, and that of $r_i$ to be $0 \leq r_i < +1$, then the relation between the overflow of the R register 80 and the increment $\Delta Z_i$ of the output variable being defined as the following expression:

$$\left. \begin{array}{l} r_{i-1} + Y_i \geq 1 \rightarrow \Delta Z_i = +1 \\ 0 \leq r_{i-1} + Y_i < 1 \rightarrow \Delta Z_i = 0 \\ -1 \leq r_{i-1} + Y_i < 0 \rightarrow \Delta Z_i = -1 \end{array} \right\} \qquad (6)$$

In other words, when the value, $r_{i-1} + Y_i$, to be stored in the R register 80 is 1 or above, the value of $\Delta Z_i = +1$ is produced, and the surplus to be overflowed from the level +1 is stored as $r_i$ in the R register.

When $r_{i-1}+Y_i$ becomes negative, the value of $\Delta Z_i = -1$ is produced, the deficiency by which the value of $r_{i-1}+Y_i$ is larger than $-1$, i.e., the value of $r_{i-1}+Y_i+1 \geq 0$ is stored as $r_i$ in the R register 80. The $\Delta Z_i$ is a pulse showing the quantized increment, and has the weight of $\epsilon$. This pulse is used as the input increment data $\Delta x_i$, $\Delta Y_{ki}$ of other DDA arithmetic units.

The elements of the arrangement of FIG. 6 correspond to those of FIG. 7 as follows.

The $\Delta Z$ memory 82 in FIG. 6 corresponds to the inputs $\Delta Y_l$ to $\Delta Y_n$ of the adder 76 in FIG. 7, and the adder 84 to the adder 76.

Similarly, the Y memory 83 corresponds to the Y register 77, the adder 85 to the adder 79, the R memory 86 to the R register 80, and the $\Delta Z$ generator 87 to the overflow $\Delta Z$.

In FIG. 6, the head address of the DDA operation sequence to be executed is preset in the microprogram address register 66. After the operation sequence is started, the address is increased by +1 at each iteration, and supplied as addressing information to the microprogram memory 72 in which is stored the DDA operation program micro-coded. Thus, the DDA operation program, which specifies the DDA operation, is read in sequence and executed.

The $\Delta Z$ memory 82, Y memory 83, and R memory 86 are connected to the DMA bus 15 so that data can be written in or read from the host processor 11, as is the microprogram memory 72. Therefore, it is possible to set parameters for specifying the DDA operation or to make reference to the results on the way of operation from the host processor 11.

Figure 8:
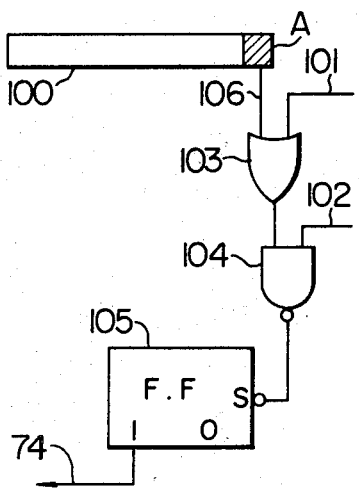
FIG. 8 is a circuit diagram of an example of the DDA processing routine end detector used in the arithmetic processor.

FIG. 8 shows an example of the DDA processing routine end detector.

A particular bit A of a microprogram 100 is assigned as a DDA processing routine end bit which is "on" when the DDA processing routine is finished, and "off" when the routine is not finished. The output 106 of the bit and an error detecting signal 101 are applied to an OR gate 103. A NAND gate 104 and a flip-flop 105 are also connected so that the DDA processing routine end detecting signal 74 is produced at the time of application of a timing signal 102. Consequently, the operation end interruption signal 44 is produced, and supplied to the control processor 16, which then receives the operation results and performs the next start.

When error occurs, the operation processor status signal 45 with the error information is sent to the control processor 16 together with the operation end interruption signal 44.

We claim:

1. A digital differential analyzer (DDA) connected through a first direct memory access (DMA) bus to a host processor so as to receive a parameter defining an operation, and to carry out differential analysis as a digital operation, comprising:
   (a) a host interface circuit for controlling data transfers with the host processor;
   (b) a second DMA bus connected to said host interface circuit;
   (c) an arithmetic processor connected to said second DMA bus for receiving parameters and data via said host interface circuit and said second DMA bus from said host processor under the control of a control processor, to carry out a prescribed DDA operation for outputting an end signal to said control processor;
   (d) said control processor being connected to said second DMA bus for carrying out control operations concerning said host processor and the DDA operation via said host interface circuit, and for carrying out start control, end control, control of the number of times of DDA operations, control of the operation of an execution sequence, control of the change in an operation parameter and control of the collection of interim results of operations for said arithmetic processor;
   (e) control signal lines used for the start and end control of the DDA operation which said control processor performs with the arithmetic processor, said control signal lines connecting said control processor and said arithmetic processor; and
   (f) a data memory connected to said DMA bus for storing interim results of the operation of the arithmetic processor by said control processor and being placed in a read/write condition by said host processor and said control processor.

2. A digital differential analyzer (DDA) connected through a first direct memory access (DMA) bus to a host processor according to claim 1, wherein said arithmetic processor comprises:
   (a) a microprogram memory in which is stored a microprogram for the execution of a plurality of fundamental DDA operations;
   (b) a microprogram address controller for detecting whether or not a pattern read from said microprogram memory corresponds to a specific pattern showing the end signal of each fundamental DDA operation; and
   (c) a status controller for inputting the end signal of each fundamental DDA operation from said microprogram address controller and outputting an operation end interrupt signal via said control signal line to said control processor.

3. A digital differential analyzer (DDA) connected through a first direct memory access (DMA) bus to a host processor according to claim 2, wherein said control processor comprises an arithmetic processor control unit which supplies a head address of the microprogram corresponding to each fundamental DDA operation thereby to start the arithmetic processor, and receives the DDA operation end signal to allow said arithmetic processor to perform the next fundamental DDA operation.

4. A digital differential analyzer (DDA) connected through a first direct memory access (DMA) bus to a host processor according to claim 2, wherein said microprogram memory has a DMA function capable of read and write operation, and thereby the host processor can write in and read from said microprogram memory through the first DMA bus, host interface circuit and second DMA bus, thus a microprogram being defined to execute any fundamental DDA operation.

5. A digital differential analyzer (DDA) connected through a first direct memory access (DMA) bus to a host processor according to claim 2, wherein said arithmetic processor has a plurality of memories for storing operation parameter which memories have a capability of read/write due to the DMA function.

* * * * *